US012586832B2

(12) United States Patent (10) Patent No.: US 12,586,832 B2
Kim (45) Date of Patent: Mar. 24, 2026

(54) APPARATUS FOR MEASURING TEMPERATURE OF BATTERY CELL

(71) Applicant: HYUNDAI MOBIS Co., Ltd., Seoul (KR)

(72) Inventor: Jung Hoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 822 days.

(21) Appl. No.: 17/825,733

(22) Filed: May 26, 2022

(65) Prior Publication Data

US 2022/0384866 A1 Dec. 1, 2022

(30) Foreign Application Priority Data

May 27, 2021 (KR) ......................... 10-2021-0068672

(51) Int. Cl.
*H01M 10/48* (2006.01)
*G01K 1/143* (2021.01)
*G01K 3/14* (2006.01)
*G01K 7/00* (2006.01)
*G01K 13/00* (2021.01)
(Continued)

(52) U.S. Cl.
CPC .......... *H01M 10/486* (2013.01); *G01K 1/143* (2013.01); *G01K 3/14* (2013.01); *G01K 7/00* (2013.01); *G01K 13/00* (2013.01); *H01M 10/613* (2015.04); *H01M 10/63* (2015.04); *H01M 10/6556* (2015.04); *H01M 10/6568* (2015.04); *H01M 10/658* (2015.04)

(58) Field of Classification Search
CPC .. H01M 10/486; H01M 10/613; H01M 10/63;
H01M 10/6556; H01M 10/6568; H01M
10/658; H01M 10/6555; H01M 10/48;
G01K 1/143; G01K 3/14; G01K 7/00;
G01K 13/00; G01K 1/16; Y02E 60/10
See application file for complete search history.

(56) References Cited

U.S. PATENT DOCUMENTS 9,831,536 B2 * 11/2017 Lim ..................... H01M 50/507
9,834,536 B2 * 12/2017 Takahashi ............ B01J 31/0267
(Continued)

FOREIGN PATENT DOCUMENTS

CN 110926650 A * 3/2020 ............ B60S 1/0822
DE 102005045216 A1 * 4/2007 ............... G01K 1/16
(Continued)

OTHER PUBLICATIONS

Notice of Allowance issued on Nov. 14, 2025 in Korean Patent Application No. 10-2021-0068672.

*Primary Examiner* — Laura Martin
*Assistant Examiner* — Julia Fitzpatrick
(74) *Attorney, Agent, or Firm* — Morgan, Lewis & Bockius LLP

(57) ABSTRACT

The present disclosure relates to an apparatus of measuring a temperature of a battery cell, which may measure temperature values at a plurality of locations through a plurality of temperature sensors arranged at the locations below a water-cooled battery cell module, and thus may identify a temperature difference between an upper portion and a lower portion of a battery cell, which is not visually identified, as well as all temperature values at all locations below the battery cell.

4 Claims, 7 Drawing Sheets

<u>100</u>

(51) Int. Cl.

| | |
|---|---|
| *H01M 10/613* | (2014.01) |
| *H01M 10/63* | (2014.01) |
| *H01M 10/6556* | (2014.01) |
| *H01M 10/6568* | (2014.01) |
| *H01M 10/658* | (2014.01) |

(56) References Cited

U.S. PATENT DOCUMENTS

| | | | | |
|---|---|---|---|---|
| 10,290,909 B2 * | 5/2019 | Lee | ........................ | H01M 10/48 |
| 2013/0004811 A1 * | 1/2013 | Banerjee | ............. | H01M 10/443 |
| | | | | 374/185 |
| 2015/0064526 A1 * | 3/2015 | Ramsayer | ................ | G01K 7/08 |
| | | | | 429/90 |
| 2018/0172520 A1 * | 6/2018 | Jang | ........................ | G01K 13/20 |
| 2018/0364108 A1 * | 12/2018 | Tanaka | .................... | G01K 7/22 |
| 2019/0165434 A1 * | 5/2019 | Born | ........................ | B60L 50/64 |

FOREIGN PATENT DOCUMENTS

| | | | | | | |
|---|---|---|---|---|---|---|
| EP | | 2780972 | B1 * | 10/2015 | ............. | G01K 13/00 |
| EP | | 3637074 | B1 * | 4/2021 | ............... | G01K 1/14 |
| GB | | 2387232 | A * | 10/2003 | ............... | G01K 1/16 |
| JP | | 2004-022496 | A | 1/2004 | | |
| KR | 10-2006-0027578 | | A | 3/2006 | | |
| KR | | 2013034282 | A * | 4/2013 | .......... | H01M 10/486 |

* cited by examiner

100

100

110

REFRIGERANT
FLOW PASSAGE

111

140

BATTERY CELL

100

MANAGEMENT TERMINAL

BATTERY CELL MODULE — 140

INSULATING PLATE — 130

ELECTRONIC CONTROL UNIT

TEMPERATURE SENSOR MODULE — 120

COOLING CONDUCTOR — 110

150

<u>100</u>

MANAGEMENT TERMINAL

BATTERY CELL MODULE — 140

INSULATING PLATE — 130

ELECTRONIC CONTROL UNIT

TEMPERATURE SENSOR MODULE — 120

COOLING CONDUCTOR — 110

150

REFRIGERANT SUPPLY UNIT — 160

APPARATUS FOR MEASURING TEMPERATURE OF BATTERY CELL

CROSS-REFERENCE TO RELATED APPLICATION

This application claims priority to and the benefit of Korean Patent Application No. 10-2021-0068672, filed on May 27, 2021, the disclosure of which is incorporated herein by reference in its entirety.

BACKGROUND

1. Technical Field

The present disclosure relates to an apparatus for measuring a temperature of a battery cell, and more particularly, to an apparatus for measuring a temperature of a battery cell, which may measure temperature values at a plurality of locations through a plurality of temperature sensors arranged at the locations below a water-cooled battery cell module, and thus may uniformly identify a temperature difference between an upper portion and a lower portion of a battery cell, which is not visually identified, as well as temperature values at all locations below the battery cell.

2. Discussion of Related Art

In general, water cooling-type cooling structures for more efficient cooling are applied to battery cells mounted on vehicles.

In the case of a water cooling method according to the related art, a temperature value of a portion (for example, an upper portion, a side portion, or the like) of the battery cell, which is visually identified, may be easily identified, but it is difficult to identify a temperature difference inside the battery cell.

In particular, a battery cell module has a structure in which a plurality of battery cells are coupled, and in the related art, since a temperature value of only one portion of the battery cell module is measured and the temperature of the one portion is then estimated as the temperature value of the entire battery cell module, temperature values of the battery cell module at locations cannot be accurately identified.

SUMMARY

The present disclosure is directed to providing an apparatus for measuring a temperature of a battery cell, which may measure temperature values at a plurality of locations through a plurality of temperature sensors arranged at the locations below a water-cooled battery cell module, and thus may uniformly identify a temperature difference between an upper portion and a lower portion of a battery cell, which is not visually identified, as well as temperature values at all locations below the battery cell.

According to an aspect of the present disclosure, there is provided an apparatus for measuring a temperature of a battery cell, the apparatus including a cooling conductor having a refrigerant flow passage formed in an inward longitudinal direction, a temperature sensor module inserted into each of one or more grooves formed in an upper side of the cooling conductor in a longitudinal direction, an insulating plate stacked on the cooling conductor and having one or more through-holes through which one side of the temperature sensor module passes, and a battery cell module stacked on the insulating plate.

The temperature sensor module may include a temperature sensor which is inserted into and accommodated in the groove and of which a region protruding upward is inserted into the through-hole of the insulating plate to be in contact with the battery cell module, and a cable extending from one side of the temperature sensor and inserted into and accommodated in the groove, and side surfaces and lower surfaces of the temperature sensor and the cable may be thermally insulated.

A contact-type temperature sensor that measures a temperature value while the region protruding upward is in contact with a lower surface of the battery cell module through the through-hole may be applied to the temperature sensor.

The through-holes may be arranged at a plurality of locations in the insulating plate.

According to another aspect of the present disclosure, there is provided an apparatus for measuring a temperature of a battery cell, the apparatus including a cooling conductor having a refrigerant flow passage extending in an inward longitudinal direction, one or more temperature sensor modules respectively disposed in one or more grooves extending on an upper side of the cooling conductor in a longitudinal direction, an insulating plate stacked on the cooling conductor and having one or more through-holes through which respective one sides of the one or more temperature sensor modules pass, a battery cell module stacked on the insulating plate and an electronic control unit (ECU) connected to the one or more temperature sensor modules, and configure to store a temperature value at each of a plurality of locations of a lower portion of the battery cell module, which is measured through a corresponding one of the one or more temperature sensor modules and to transmit the temperature value to a management terminal.

According to still another aspect of the present disclosure, there is provided an apparatus for measuring a temperature of a battery cell, the apparatus including a cooling conductor having a refrigerant flow passage extending in an inward longitudinal direction, one or more temperature sensor modules respectively disposed in one or more grooves extending on an upper side of the cooling conductor in a longitudinal direction, an insulating plate stacked on the cooling conductor and having one or more through-holes through which respective one sides of the one or more temperature sensor modules pass, a battery cell module stacked on the insulating plate, an electronic control unit (ECU) connected to the one or more temperature sensor modules, and configured to store a temperature value at each of a plurality of locations of a lower portion of the battery cell module, which is measured through a corresponding one of the one or more temperature sensor modules and to transmit the temperature value to a management terminal, and a refrigerant supply unit connected to the cooling conductor and configured to supply a refrigerant to the refrigerant flow passage.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments are presented to help understanding of the present disclosure. However, the following embodiments are merely provided for easier understanding of the present disclosure, and the contents of the present disclosure are not limited by the following embodiments.

Figure 1:
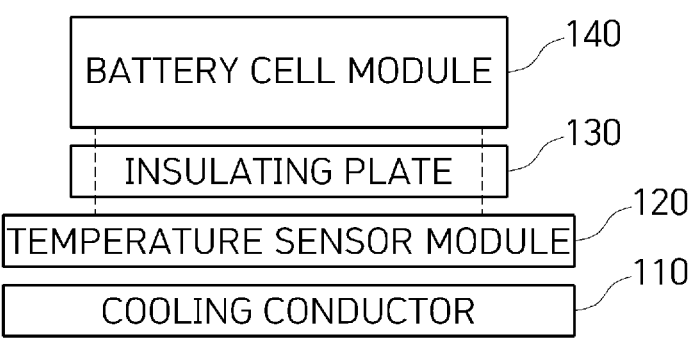
FIG. 1 is a view illustrating a configuration of an apparatus for measuring a temperature of a battery cell according to one embodiment of the present disclosure.
Figure 2:
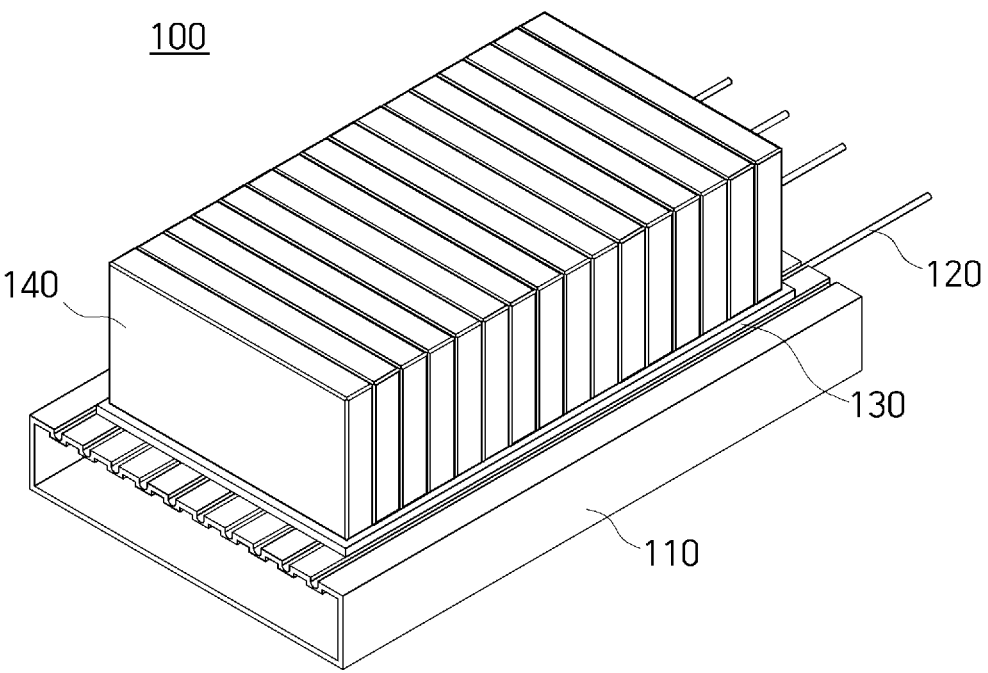
FIG. 2 is a schematic view illustrating a shape of the apparatus for measuring a temperature of a battery cell, illustrated in FIG. 1.
Figure 3:
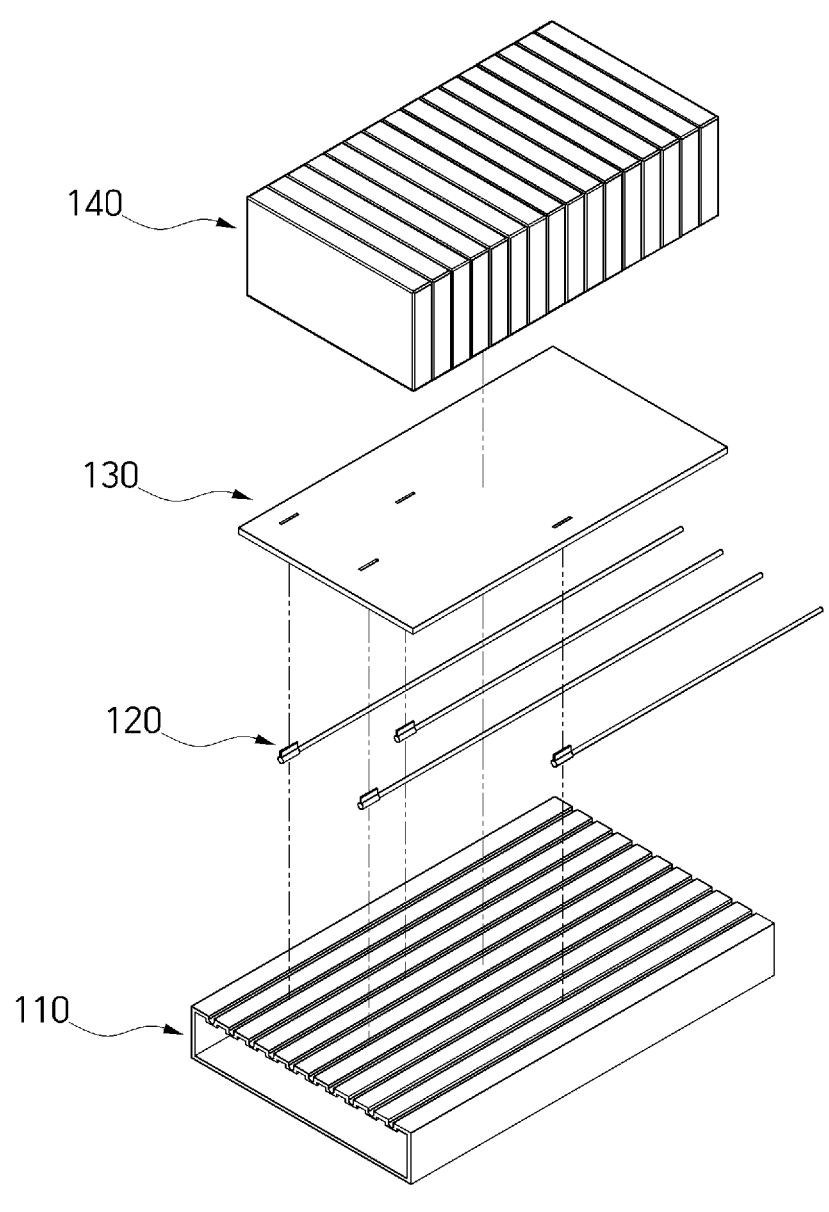
FIG. 3 is an exploded perspective view of FIG. 2.
Figure 4:
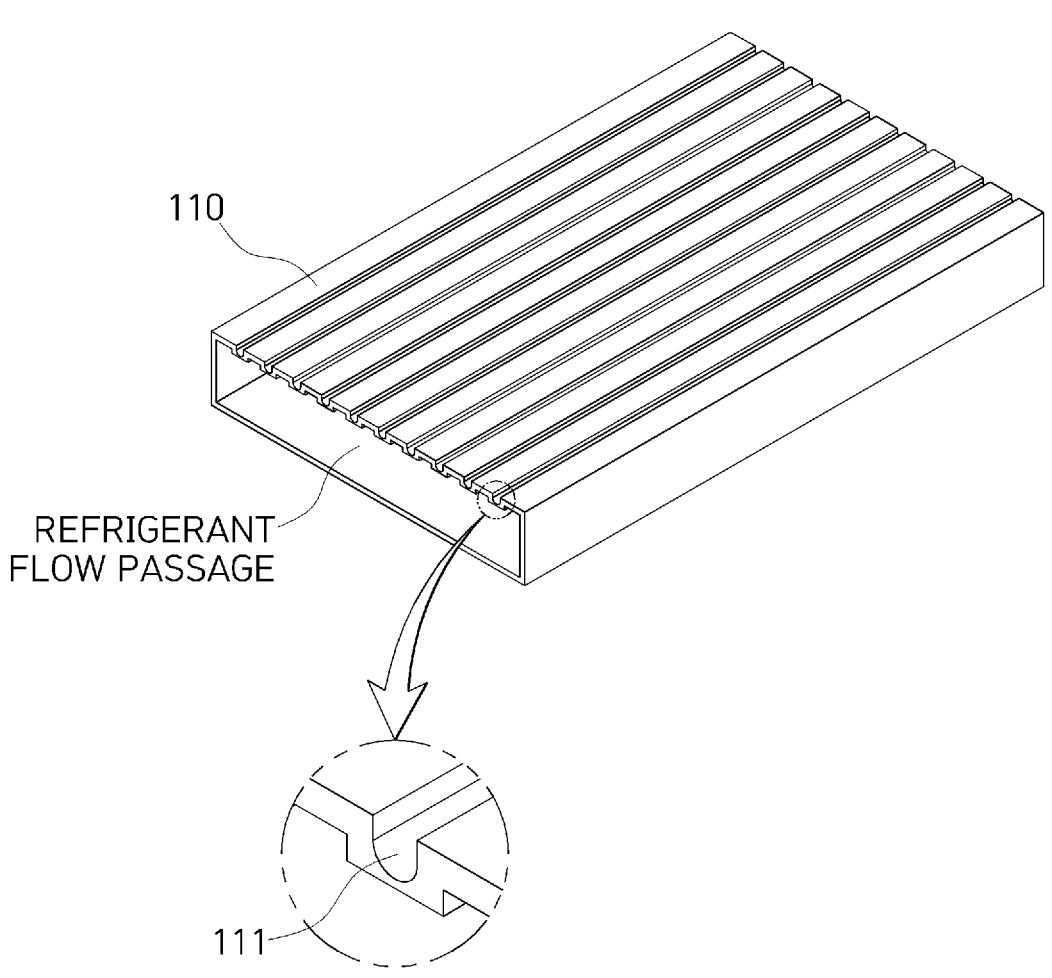
FIG. 4 is a view illustrating a cooling conductor in more detail.
Figure 5:
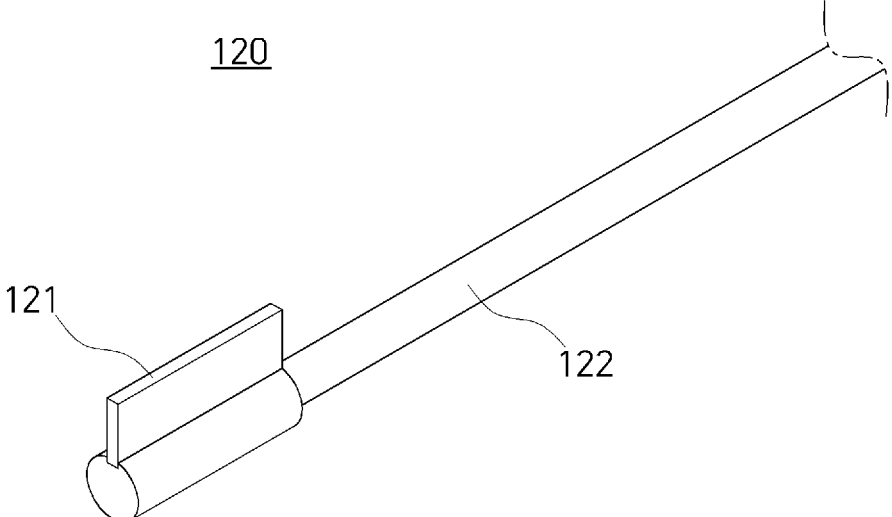
FIG. 5 is a view illustrating a temperature sensor module in more detail.
Figure 6:
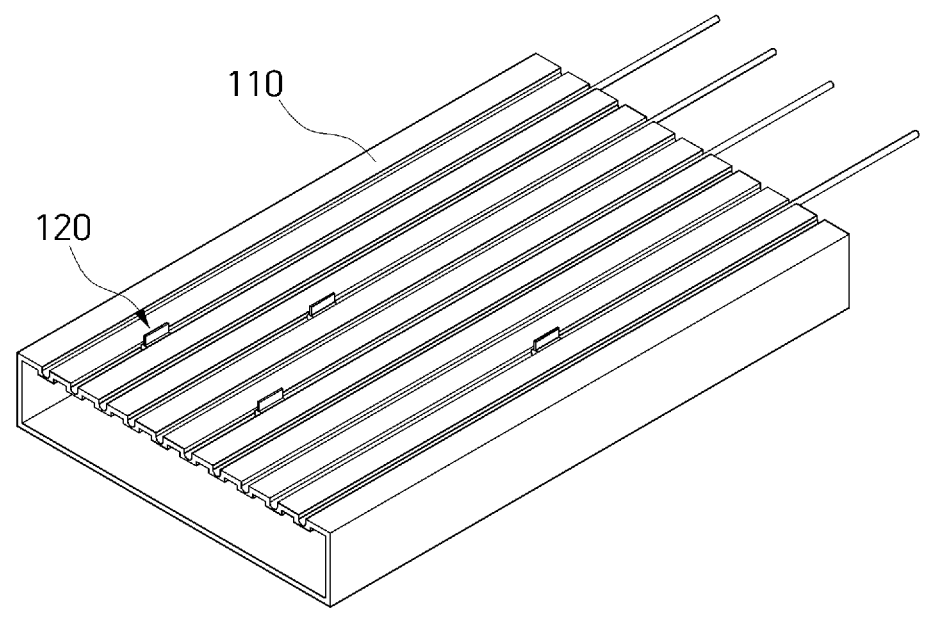
FIG. 6 is a view illustrating a state in which the temperature sensor module is inserted into a groove of the cooling conductor.
Figure 7:
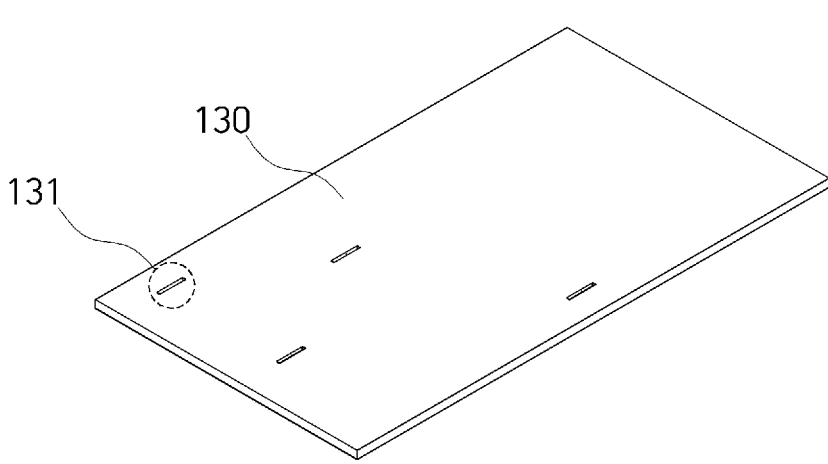
FIG. 7 is a view illustrating an insulating plate in more detail.
Figure 8:
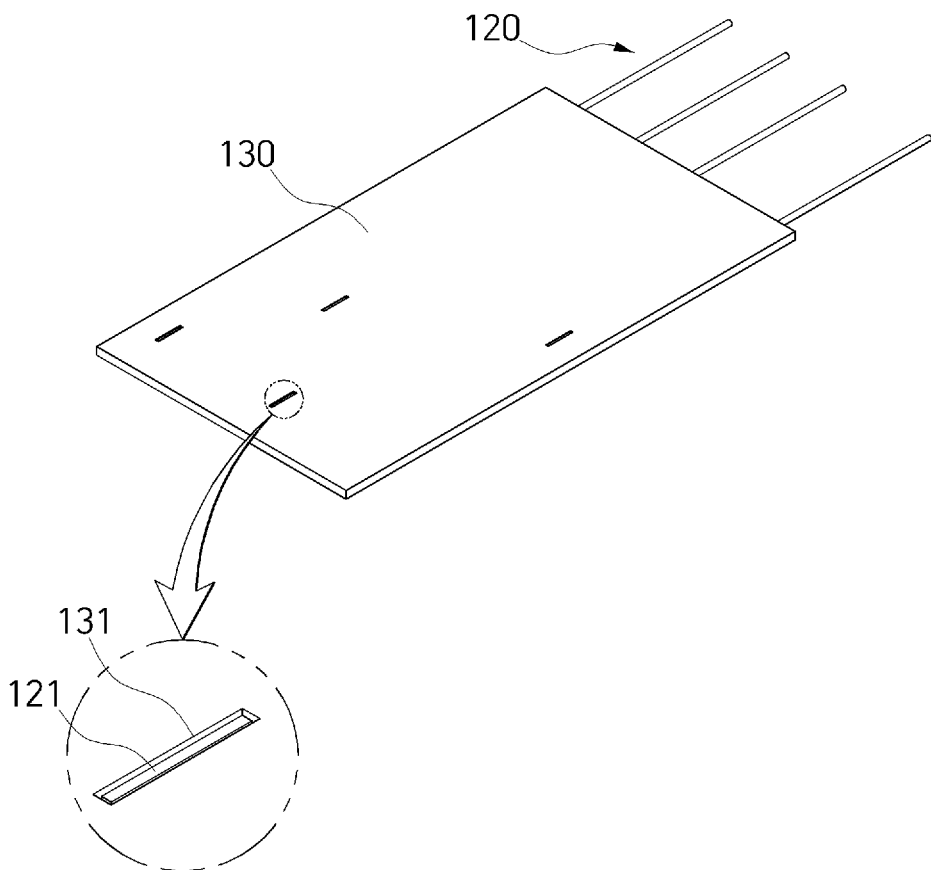
FIG. 8 is a view illustrating a state in which a temperature sensor of the temperature sensor module is inserted into a through-hole of the insulating plate in a trimming structure.
Figure 9:
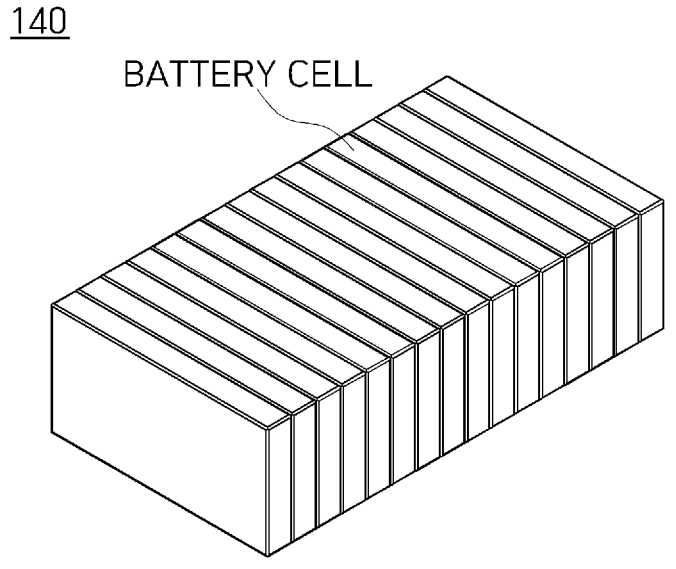
FIG. 9 is a view illustrating a battery cell module in more detail.

FIG. 1 is a view illustrating a configuration of an apparatus 100 for measuring a temperature of a battery cell according to one embodiment of the present disclosure, FIG. 2 is a schematic view illustrating a shape of the apparatus 100 for measuring a temperature of a battery cell, illustrated in FIG. 1, FIG. 3 is an exploded perspective view of FIG. 2, FIG. 4 is a view illustrating a cooling conductor 110 in more detail, FIG. 5 is a view illustrating a temperature sensor module 120 in more detail, FIG. 6 is a view illustrating a state in which the temperature sensor module 120 is inserted into a groove 111 of the cooling conductor 110, FIG. 7 is a view illustrating an insulating plate 130 in more detail, FIG. 8 is a view illustrating a state in which a temperature sensor of the temperature sensor module 120 is inserted into a through-hole 131 of the insulating plate 130 in a trimming structure, and FIG. 9 is a view illustrating a battery cell module 140 in more detail.

Referring to FIGS. 1 to 9, the apparatus 100 for measuring a temperature of a battery cell according to one embodiment of the present disclosure may roughly include the cooling conductor 110, the temperature sensor module 120, the insulating plate 130, and the battery cell module 140.

The cooling conductor 110 has a refrigerant flow passage formed in an inward longitudinal direction and is cooled as a refrigerant is supplied along the refrigerant flow passage to serve to cool the battery cell module 140. Here, the refrigerant may be water or glycol water. Copper or aluminum having excellent thermal conductivity may be applied to the cooling conductor 110.

One or more grooves 111 are formed in an upper portion of the cooling conductor 110 in a longitudinal direction by being recessed inward. The grooves 111 may be formed in a depth sufficient for accommodating a cable 122 of the temperature sensor module 120. In this case, the number of the cooling conductors 110 is not limited.

The temperature sensor module 120 may be provided in each of the one or more grooves 111 of the cooling conductor 110, and as a region, which protrudes upward, of the temperature sensor module 120 comes into contact with the battery cell module 140, a temperature value of a lower portion of the battery cell module 140 is measured.

In more detail, the temperature sensor module 120 is provided as a plurality of temperature sensor modules 120 to measure all temperature values of lower portions of battery cells constituting the battery cell module 140. For example, when the temperature sensor modules 120 are arranged in lower corner regions of the battery cell module 140, the temperature values of the lower corner regions of the battery cell module 140 may be simultaneously measured. In this case, an arrangement location of the temperature sensor module 120 is not limited.

The temperature sensor module 120 includes a temperature sensor 121 that is inserted into and accommodated in the groove 111 and has one side protruding upward to be in contact with a lower surface of the battery cell module 140, and the cable 122 extending from the temperature sensor 121 and inserted into and accommodated in the groove 111.

The temperature sensor 121 protrudes upward to a certain height, and in particular, as one or more through-holes 131 are formed in the insulating plate 130 stacked on the cooling conductor 110, the protruding portion of the temperature sensor 121 passes through the through-holes 131 to come into contact with the lower surface of the battery cell module 140 in a trimming structure.

In this case, the number of the temperature sensors 121 and the number of the cables 122 are not limited and may be provided to correspond to the number of the grooves 111 formed in the upper portion of the cooling conductor 110.

In particular, the plurality of temperature sensors 121 may not be arranged in one line with respect to a width direction of the cooling conductor 110 but may be alternately arranged at regular intervals in a zigzag form. This is for detecting a temperature change of the entirety of a lower surface corresponding to a large area of the battery cell module 140 as the plurality of temperature sensors 121 are uniformly distributed below the battery cell module 140.

Meanwhile, in one embodiment, a side surface and a lower surface of the temperature sensor 121 and the entire outer surface of the cable 122 may be thermally insulated. This is because the temperature sensor 121 and the cable 122 are in direct contact with the cooling conductor 110, and particularly, is for preventing a temperature measurement operation of the temperature sensor 121 from being affected by the cooling conductor 110. Thus, through this thermal insulation, the temperature sensor 121 may completely detect the temperature value of the battery cell module 140.

In one embodiment, a contact-type temperature sensor that measures the temperature value while being in direct contact with the lower surface of the battery cell module 140 may be applied to the temperature sensor 121.

Alternatively, in another embodiment, a non-contact-type temperature sensor that measures the temperature value while being spaced apart from the lower surface of the battery cell module 140 by a predetermined interval may be applied to the temperature sensor 121.

The insulating plate 130 is stacked on the cooling conductor 110 and is interposed between the battery cell module 140 and the cooling conductor 110.

In this case, the plurality of through-holes 131 through which protruding regions of the temperature sensors 121 pass as described above are formed in the insulating plate 130. The size of the through-holes 131 may be formed to correspond to the size of the protruding regions of the temperature sensors 121, and the thickness of the insulating plate 130 may be formed to correspond to the height of the protruding regions of the temperature sensors 121.

The insulating plate 130 may serve to block electrical conduction that may occur between the battery cell module 140 and the cooling conductor 110 and may be formed to have an area corresponding to an area of the lower surface of the battery cell module 140.

The battery cell module 140 corresponds to a power source of an environmental-friendly electric vehicle and has a structure in which a plurality of battery cells are arranged in one line and are electrically connected. In this case, an upper and lower displacement difference occurs according to the shape of the battery cells, this displacement difference causes a difference between temperature values of upper and lower portions of the battery cells, and the present disclosure is for more accurately measuring the difference between the temperature values of upper and lower portions of the battery cells.

Meanwhile, in another embodiment of the present disclosure, in addition to the configurations described above, the apparatus 100 for measuring a temperature of a battery cell may further include an electronic control unit (ECU) that may transmit the temperature value measured through the temperature sensor module 120 to a separate management terminal (for example, a vehicle-side ECU of the like).

Figure 10:
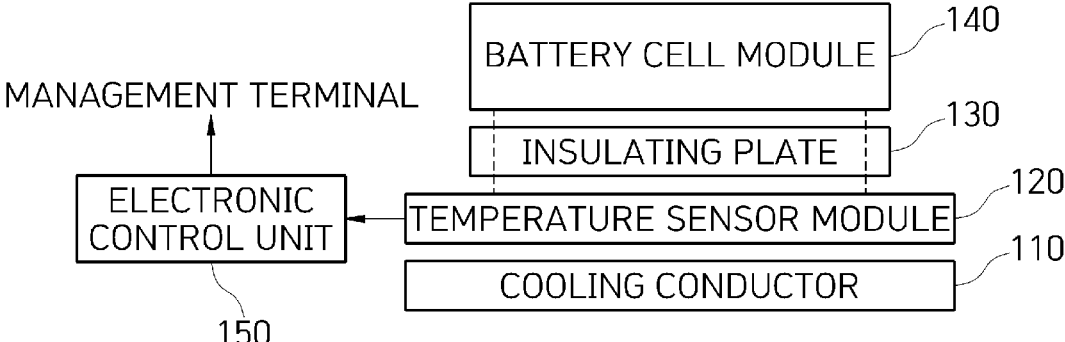
FIG. 10 is a view illustrating a configuration of an apparatus for measuring a temperature of a battery cell according to another embodiment of the present disclosure.

FIG. 10 is a view illustrating a configuration of an apparatus 100 for measuring a temperature of a battery cell according to another embodiment of the present disclosure.

Referring to FIG. 10, the apparatus 100 for measuring a temperature of a battery cell according to another embodiment of the present disclosure may further include an ECU 150 in addition to the components described above.

The ECU 150 may be connected to the temperature sensors 121 of the temperature sensor module 120 in a wired/wireless network communication manner and may serve to acquire and store the temperature values of lower locations of the battery cell module 140, which are measured through the temperature sensors 121, and to transmit the temperature values to the management terminal (for example, a vehicle-side ECU, a manager terminal, or the like).

In this case, the ECU 150 may make a database using the temperature values of lower locations of the battery cell module 140, may add information on a temperature value measured through another temperature sensor installed in the battery cell module 140 of the vehicle, and thus may support calculation and management of the overall temperature value of the battery cell module 140 in the vehicle-side ECU.

Further, in still another embodiment of the present disclosure, the apparatus 100 for measuring a temperature of a battery cell may further include a refrigerant supply unit for continuously supplying a refrigerant to the refrigerant flow passage of the cooling conductor 110 in addition to the configuration described with reference to FIG. 10.

Figure 11:
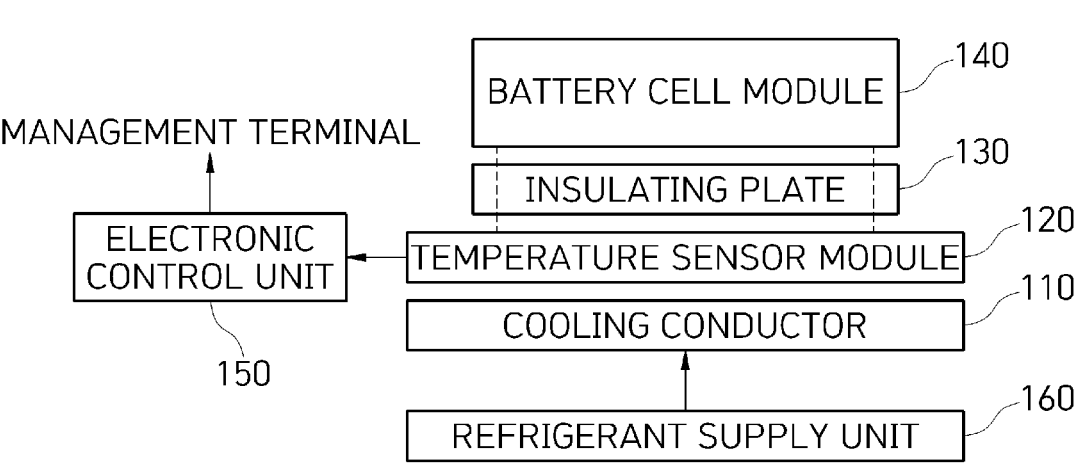
FIG. 11 is a view illustrating a configuration of an apparatus for measuring a temperature of a battery cell according to still another embodiment of the present disclosure.

FIG. 11 is a view illustrating a configuration of an apparatus 100 for measuring a temperature of a battery cell according to still another embodiment.

Referring to FIG. 11, the apparatus 100 for measuring a temperature of a battery cell according to still another embodiment of the present disclosure may further include a refrigerant supply unit 160 in addition to the configuration described above with reference to FIG. 10.

The refrigerant supply unit 160 may continuously inject a refrigerant into the refrigerant flow passage through a refrigerant inlet (not illustrated) provided in the cooling conductor 110, and in particular, may re-cool the refrigerant discharged and collected through a refrigerant outlet (not illustrated) to re-inject the cooled refrigerant into the refrigerant inlet. The refrigerant supply unit 160 may include a radiator (not illustrated) that dissipates heat of the collected refrigerant.

Meanwhile, the shapes of the cooling conductor 110, the temperature sensor module 20, the insulating plate 130, and the battery cell module 140 illustrated in the accompanying drawings of the present disclosure are not limited to the accompanying drawings. The shapes may be changed according to various shapes of the battery cell module 140 as much as possible. In particular, it is noted that all the apparatus 100 for measuring a temperature of a battery cell according to the present disclosure may be applied as long as the battery cell module 140 has a structure in which the upper and lower displacement difference may occur.

According to one aspect of the present disclosure, all temperature values at all locations below a battery cell as well as a temperature difference between an upper portion and a lower portion of the battery cell, which is not identified visually, can be identified.

Further, according to one aspect of the present disclosure, since a contact-type temperature sensor is applied to a cooling conductor applied to a cooling structure of the existing water-cooled battery cell, the contact-type temperature sensor can be easily and conveniently applied to a structure and specifications in which the battery cell can be cooled through being in contact with the existing coolant, and in particular, and a temperature difference between two-dimensional locations (X-axis and Y-axis distribution) inside the battery cell can be accurately identified.

In particular, the present disclosure can be applied to all battery cells having a structure in which an upper and lower displacement difference occurs.

Further, according to one aspect of the present disclosure, since a lower portion of the temperature sensor in direct contact with the battery cell is thermally insulated, the temperature sensor can be prevented from being cooled by the cooling conductor located therebelow, and thus the temperature sensor can more accurately measure the temperature value of the battery cell.

Although the exemplary embodiments of the present disclosure have been described above, those skilled in the art may understand that the present disclosure may be variously modified and changed without departing from the spirit and scope of the present disclosure described in the appended claims.

What is claimed is:

1. An apparatus for measuring a temperature of a battery cell, the apparatus comprising:
a cooling conductor having a refrigerant flow passage extending in an inward longitudinal direction;
one or more temperature sensor modules respectively disposed in one or more grooves extending on an upper side of the cooling conductor in a longitudinal direction;
an insulating plate stacked on the cooling conductor and having one or more through-holes through which respective one sides of the one or more temperature sensor modules pass; and
a battery cell module stacked on the insulating plate, wherein each of the one or more temperature sensor modules comprises a temperature sensor and a cable, and wherein the one or more grooves is configured to respectively accommodate the temperature sensor and the cable of the each of the one or more temperature sensor modules.

2. The apparatus of claim 1, wherein each of the one or more temperature sensor modules includes:

a temperature sensor accommodated in a corresponding one of the one or more grooves and having a region protruding upward and passing a corresponding one of the one or more through-holes of the insulating plate to be in contact with the battery cell module; and a cable extending from one side of the temperature sensor and accommodated in the groove, and side surfaces and lower surfaces of the temperature sensor and the cable are thermally insulated.

3. The apparatus of claim 2, wherein the temperature sensor includes a contact-type temperature sensor configured to measure a temperature value when the region protruding upward is in contact with a lower surface of the battery cell module through the through-hole.

4. The apparatus of claim 2, wherein the one or more through-holes are respectively arranged at a plurality of locations in the insulating plate.

* * * * *